United States Patent
Zuo et al.

(10) Patent No.: US 10,095,140 B2
(45) Date of Patent: Oct. 9, 2018

(54) STYRENE/ACRYLATE AND POLYESTER RESIN PARTICLES

(71) Applicant: Xerox Corporation, Norwalk, CT (US)

(72) Inventors: Yanjia Zuo, Rochester, NY (US); Shigeng Li, Penfield, NY (US); Robert D Bayley, Fairport, NY (US); Peter V Nguyen, Webster, NY (US); Linda S Schriever, Penfield, NY (US); Gregory K Thompson, Macedon, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/937,597

(22) Filed: Nov. 10, 2015

(65) Prior Publication Data

US 2017/0130044 A1    May 11, 2017

(51) Int. Cl.
| | | |
|---|---|---|
| *G03G 9/08* | (2006.01) | |
| *C08L 25/14* | (2006.01) | |
| *C08L 25/10* | (2006.01) | |
| *G03G 9/087* | (2006.01) | |
| *G03G 9/093* | (2006.01) | |
| *C08L 67/00* | (2006.01) | |

(52) U.S. Cl.
CPC ............ *G03G 9/0825* (2013.01); *C08L 25/10* (2013.01); *C08L 25/14* (2013.01); *C08L 67/00* (2013.01); *G03G 9/08706* (2013.01); *G03G 9/08755* (2013.01); *G03G 9/08797* (2013.01); *G03G 9/09328* (2013.01); *G03G 9/09371* (2013.01)

(58) Field of Classification Search
CPC ............ G03G 9/0825; G03G 9/09321; G03G 9/09371; G03G 9/09328; C08L 25/14; C08L 67/00
See application file for complete search history.

(56) References Cited

U.S. PATENT DOCUMENTS

| | | | |
|---|---|---|---|
| 5,382,624 A * | 1/1995 | Hotta | C08F 283/02 430/109.3 |
| 9,046,801 B2 | 6/2015 | Nosella et al. | |
| 9,280,075 B1 * | 3/2016 | Zuo | G03G 9/09364 |
| 9,280,076 B1 * | 3/2016 | Li | G03G 9/0804 |
| 9,304,421 B2 * | 4/2016 | Sekiguchi | G03G 9/08704 |
| 2010/0297546 A1 * | 11/2010 | Zhou | G03G 9/0819 430/108.23 |
| 2011/0244383 A1 * | 10/2011 | Yamamoto | G03G 9/0806 430/105 |
| 2012/0114977 A1 * | 5/2012 | Mitsuoka | C08J 5/18 428/847.2 |
| 2014/0113227 A1 * | 4/2014 | Shinya | G03G 9/08 430/108.2 |
| 2014/0287354 A1 * | 9/2014 | Kawamura | G03G 9/0825 430/109.3 |
| 2014/0349231 A1 * | 11/2014 | Shirai | G03G 9/0825 430/109.4 |
| 2014/0356780 A1 * | 12/2014 | Kawamura | G03G 9/08724 430/109.3 |
| 2015/0118610 A1 | 4/2015 | Nosella et al. | |
| 2015/0227069 A1 * | 8/2015 | Sugama | G03G 9/08733 430/109.4 |
| 2017/0010549 A1 * | 1/2017 | Bejat | G03G 9/08755 |

* cited by examiner

*Primary Examiner* — Christopher D Rodee

(74) *Attorney, Agent, or Firm* — Marylou J. Lavoie, Esq. LLC

(57) ABSTRACT

The present disclosure describes poly(styrene/acrylate)-polyester hybrid particles, wherein poly(styrene/acrylate) polymers are polymerized and entangled within a polyester seed particle in an interpenetrating polymer network.

13 Claims, No Drawings

STYRENE/ACRYLATE AND POLYESTER RESIN PARTICLES

FIELD

The disclosure relates to emulsion polymerization methods for preparing poly(acrylate/styrene) and polyester hybrid resin particles by forming interpenetrating polymer networks for use in preparing toner.

BACKGROUND

Polyester latex provides toner with desirable rheologic properties in fusing and low minimum fix temperature. But polyester toner has a relatively high production cost. Moreover, polyester toners are sensitive to RH. Humidity impacts triboelectric charge of the polyester toner particles, which in turn, impacts xerographic performance and image quality.

Polystyrene/acrylate toners have higher melting temperature but have a relatively lower cost of production.

Hybrid toners have been prepared, for example, by blending 10% of polystyrene/butyl acrylate latex with polyester latex via nominal aggregation coalescence processes (U.S. Ser. No. 14/561,543). In other methods, hybrid toner was prepared having a styrene/butyl acrylate shell over a core of both polyester and styrene/butyl acrylate resins using a continuous coalescence process (US Pub. No. 20150118610) or where the core was comprised of styrene/acrylate resin and a polyester shell by a two step aggregation coalescence process (U.S. Pat. No. 9,046,801).

Preparation of each of those hybrid toners requires complicated subsequent aggregation coalescence or continuous coalescence process adjustments to blend the styrene/acrylate into emulsion aggregation (EA) toners, which is costly and inefficient.

Accordingly, there remains a need to blend poly(acrylate/styrene) and polyester resins in toner to stabilize charge and to capitalize on the desirable rheologic properties of polyester resins. That problem was addressed herein by preparing hybrid latex using a novel semi-continuous emulsion polymerization method forming interpenetrating polymer networks (IPN's) of the styrene/acrylate resin in hydrated polyester resin seed particles. The IPN method provides a unique way to combine intimately polyester and poly(acrylate/styrene) polymers by permanent interlocking of entangled polymer chains.

SUMMARY

The instant disclosure describes hybrid resin particles comprising a polyester seed particle and interspersed therein and thereon, poly(styrene/acrylate) polymers, wherein the poly(styrene/acrylate) polymers chains are entangled within the polyester seed particle in an interpenetrating network (IPN), forming the hybrid resin particles. In embodiments, the seed particle has a particle size distribution at $D_{50}$ of from about 50 nm to about 150 nm. In embodiments, the hybrid particle has a particle size distribution at $D_{50}$ of from about 175 nm to about 215 nm. In embodiments, the styrene/acrylate polymers are selected from styrene acrylates, styrene butadienes, styrene methacrylates and combinations thereof.

In embodiments, toner is prepared and includes the poly(styrene/acrylate)-polyester hybrid particles, optionally a wax, optionally a colorant and optionally an amorphous polyester resin, a crystalline polyester resin or both.

In embodiments, the polyester resin is an amorphous resin, a crystalline resin or a combination thereof. The polyester resin may be a high molecular weight resin, a low molecular weight resin or combination thereof.

In embodiments, the poly(styrene/acrylate) polyester hybrid particles are prepared via semi-continuous emulsion polymerization through interpenetrating polymer network formation wherein the method comprises forming a polyester seed particle; swelling the seed particles in an aqueous solution comprising styrene/acrylate monomers; and then continuously polymerizing styrene/acrylate monomers to form poly(styrene/acrylate) polymers entangled within the polyester seed particle as an IPN as well as on and about the seed particle. In embodiments, the polyester latex comprising seed particles is prepared via phase inversion emulsification and the styrene/acrylate monomers are polymerized within, on and about the seed particles using emulsion polymerization.

DETAILED DESCRIPTION

A) Introduction

The present disclosure provides poly(styrene/acrylate)-polyester hybrid latex wherein the two species of polymers are associated in an interpenetrating polymer network (IPN). An IPN is a polymer comprising two or more networks which are at least partially interlaced, intertwined, enmeshed and so on, on a molecular scale but not covalently bonded to each other and cannot be separated unless chemical bonds are broken. The two or more networks can be envisioned to be entangled in such a way that the polymers are intertwined and cannot be pulled apart, but are not bonded to each other by any chemical bond. In the instant method, the IPN's are formed through polymerization of polyester polymers to form seed particles followed by polymerization of styrene/acrylate (SA) monomers, which have been allowed to be situated within the polyester (PE) seed particles by enabling the particles to swell during incubation of the seed particles. That process results in integration of styrene and/or acrylate monomers within the PE seed particles, which then are reacted to form poly(styrene/acrylate) polymers within, on and about the seed particles as polymerization occurs with the monomers found within, on and about the seed particle following the swelling incubation. Hence, the hybrid resin particles of interest can be described as a sequentially formed interpenetrating polymer network.

The polyester seed particles may be prepared by, for example, phase inversion emulsification (PIE), which may be polymerized using methods known in the art, see, for example, Example 1. The polyester seed particles are mixed with an aqueous solution comprising acrylate monomers, styrene monomers and surfactant, optionally at an elevated temperature, to swell the particles forming spaces or voids in the polyester seed particles allowing the acrylate and styrene monomers to enter into the substance of the seed particles. Further addition of acrylate/styrene monomers, an initiator and surfactant facilitates emulsion polymerization of poly(styrene/acrylate) resins within, on and about the seed particle where a portion of the forming and formed polySA polymers are enmeshed in the polyester seed particle, see, for example, Examples 2-4. Those components added post swelling of the seed particles may be added to a reactor at a constant rate for continuous polymerization of the poly(styrene/acrylate) polymers.

The polyester seed particles may have a size of less than about 100 nm at $D_{50}$, less than about 90 nm, less than about 80 nm, less than about 70 nm, although the seed particle size can be outside of those ranges.

In embodiments, the styrene/acrylate resin is present in the hybrid resin particles in an amount of at least about 50% by weight of the hybrid resin particle, at least about 55%, at least about 60%, at least about 65%, at least about 70% by weight of the hybrid resins; in embodiments, from about 5% to about 95% by weight, from about 7.5% to about 90%, from about 10% to about 85%, from about 12.5% to about 80% by weight; in embodiments, from about 6% to about 95%, from about 7% to about 95%, from about 8% to about 95% by weight of the hybrid resin particles, although the amount can be outside of those ranges.

The present toner particles comprising poly(styrene/acrylate)-polyester resin particles can be prepared by a number of different processes known to one of skill in the art, which include emulsion aggregation (EA), either by batch processes, continuous processes or combination thereof. In embodiments, the toner particles are prepared by a combination of batch and continuous processes wherein an emulsion of at least one poly(styrene/acrylate)-polyester resin particle, optionally a wax and optionally a colorant are combined and mixed in a batch reactor, core particles are prepared and aggregation performed in the batch or in a continuous reactor. After freezing aggregation, and addition of an optionally shell, the slurry of core/shell particles is fed into a batch or a continuous reactor to enable coalescence and to prepare the toner particles.

B) Definitions

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range, "from about 2 to about 4," also discloses the range, "from 2 to 4."

A resin particle of interest is one that contains styrene/acrylate resin and a polyester seed particle. Comparisons are made between a resin particle of interest, or a toner thereof, and one which is identical except does not contain any poly(styrene/acrylate)-polyester hybrid resin particles. Herein, the comparison or control resin particle is one which does not contain any poly(styrene/acrylate)-polyester hybrid resin particles and is described in any of a number of ways, such as, "polyester control," "poly(styrene/acrylate) control," and so on. Other terms and phrases may be used and are contemplated, and are grounded on a polyester or poly(acrylate/styrene) resin that does not contain any hybrid poly(styrene/acrylate)-polyester resin.

To ensure IPN formation within the polyester polymers of the seed particle, the polyester polymers of the seed particle are not crosslinked but instead are linear or branched chains as that allows for voids and spaces to exist in and to form on hydration and swelling of the PE seed particle. Hence, a seed particle of interest is substantially crosslinkage-free, that is, contains little to no crosslinks, that is, no more than about 5% of the polymer comprises crosslinks or is crosslinked, no more than about 4%, no more than about 3%, no more than about 2% or lower amounts of crosslinks or is crosslinked and is essentially only a linear or a branched chain.

A polymer can be identified or named herein by the two or more of the constituent monomers used to construct the polymer, even though following polymerization, a monomer is altered to form and constitute the polymer, and no longer is identical to the original reactant. For example, a polyester often is composed of a polyacid monomer or component and a polyalcohol monomer or component. Thus, if a trimellitic acid reactant is used to make a polyester polymer, that polyester polymer can be identified herein as a trimellitic polyester or as a trimellitic acid polyester.

C) Hybrid Resin Latex

Provided herein are methods for forming hybrid poly (styrene/acrylate)-polyester resin particles via sequential polymerization of a polyester resin to form seed particles, and then polymerizing poly(acrylate/styrene) polymers within, on and about those seed particles. The polyester resin may be polymerized in situ to form seed particles, or may be pre-formed and dissolved in a solvent (e.g. phase inversion emulsion) to form seed particles.

Any monomer suitable for preparing a polyester latex, such as, a polyacid (polyester) and a polyol, may be used to form the seed particles. The toners comprising hybrid resin particles may comprise any of the polyester resins described herein or known in the art.

Any polyester resin can be used, including the resins described in U.S. Pat. Nos. 6,593,049 and 6,756,176, the entire disclosure of each of which herein is incorporated by reference in entirety. The polyesters may be amorphous, crystalline or both. Suitable amorphous resins include those disclosed in U.S. Pat. No. 6,063,827, the entire disclosure of which herein is incorporated by reference in entirety. Suitable crystalline resins include those disclosed in U.S. Publ. No. 2006/0222991, the entire disclosure of which herein is incorporated by reference in entirety. Suitable polyester latexes also may include a mixture of an amorphous polyester resin and a crystalline polyester resin as described in U.S. Pat. No. 6,830,860, the entire disclosure of which herein is incorporated by reference in entirety.

In embodiments, an unsaturated polyester resin may be utilized as a polyester latex resin. Examples of such resins include those disclosed in U.S. Pat. No. 6,063,827, the entire disclosure of which herein is incorporated by reference in entirety. Exemplary unsaturated polyester resins include, but are not limited to, poly(1,2-propylene fumarate), poly(1,2-propylene maleate), poly(1,2-propylene itaconate) and so on, and combinations thereof.

The polyester polymer can be formed by reacting a polyol with a polyacid in the presence of an optional catalyst. Polycondensation catalysts which may be utilized in forming either the crystalline or amorphous polyesters include tetraalkyl titanates, dialkyltin oxides, such as, dibutyltin oxide; tetraalkyltins, such as, dibutyltin dilaurate; and dialkyltin oxide hydroxides, such as, butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole % to about 5 mole % based on the starting polyacid or polyester used to generate the polyester resin.

A, "crystalline polyester resin," is one that shows not a stepwise endothermic amount variation but a clear endothermic peak in differential scanning calorimetry (DSC). However, a polymer obtained by copolymerizing the crystalline polyester main chain and at least one other component also is called a crystalline polyester if the amount of the other component is 50% by weight or less.

Monomer polyacids having 6 to 10 carbon atoms may be desirable for obtaining suitable crystal melting point and charging properties. To improve crystallinity, a straight chain polycarboxylic acid may be present in an amount of about 95% by mole or more of the acid component, more than about 98% by mole of the acid component. Other polyacids are not particularly restricted and examples thereof include conventionally known polycarboxylic acids and polyhydric alcohols, for example, those described in, "Polymer Data Handbook: Basic Edition," (Soc. Polymer Science, Japan Ed.: Baihukan). As the alcohol component, aliphatic polyalcohols having from about 6 to about 10 carbon atoms may be used to obtain desirable crystal melting points and charging properties. To raise crystallinity, it may be useful to use the straight chain polyalcohols in an amount of about 95% by mole or more, about 98% by mole or more.

For forming a crystalline polyester, suitable polyols include aliphatic polyols with from about 2 to about 36 carbon atoms, such as, 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols, such as, sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof and the like. The aliphatic polyol may be, for example, selected in an amount of from about 40 to about 60 mole %, from about 42 to about 55 mole %, from about 45 to about 53 mole % (although amounts outside of those ranges can be used).

Examples of polyacids (or polyesters) including vinyl polyacids or vinyl polyesters selected for the preparation of a crystalline resin include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid, such as, the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfoterephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate or mixtures thereof. The polyacid may be selected in an amount of from about 40 to about 60 mole %, from about 42 to about 52 mole %, from about 45 to about 50 mole %.

The crystalline resin can possess various melting points of, for example, from about 30° C. to about 120° C., from about 50° C. to about 90° C. The crystalline resin may have a weight average molecular weight ($M_w$), as measured by gel permeation chromatography (GPC) of, for example, from about 15,000 to about 30,000, from about 20,000 to about 25,000. The molecular weight distribution ($M_w/M_n$) of the crystalline resin may be, for example, from about 2 to about 6, from about 3 to about 5. The crystalline resin particles can be from about 170 to about 230 nm in size, from about 180 to about 220 nm, from about 190 to about 210 nm in size.

However, for the purposes of seed particles, the size is smaller, from about 50 nm to about 150 nm, from about 75 nm to about 125 nm, from about 90 nm to about 110 nm.

Examples of polyacids or polyesters including vinyl polyacids or vinyl polyesters utilized for the preparation of amorphous polyesters include polycarboxylic acids (or polyesters), such as, terephthalic acid, phthalic acid, isophthalic acid, fumaric acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate and combinations thereof. The polyacid or polyester may be present, for example, in an amount from about 40 to about 60 mole % of the resin, from about 42 to about 52 mole %, from about 45 to about 50 mole % of the resin.

Examples of polyols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, dipropylene glycol, dibutylene and combinations thereof. The amount of polyol selected can vary, and may be present, for example, in an amount from about 40 to about 60 mole % of the resin, from about 42 to about 55 mole % of the resin.

A high molecular weight (HMW) amorphous resin can have a molecular weight from about 70 k to about 84 k, from about 72 k to about 82 k, from about 74 k to about 80 k. A low molecular weight (LMW) amorphous resin can have a molecular weight from about 12 k to about 24 k, from about 14 k to about 22 k, from about 16 k to about 20 k. The size can be outside of those ranges.

The amorphous resin particles can be from about 170 nm to about 230 nm, from about 180 nm to about 220 nm, from about 190 nm to about 210 nm in size. However, for the purposes of seed particles, the size is smaller, from about 50 nm to about 150 nm, from about 75 nm to about 125 nm, from about 90 nm to about 110 nm.

The polyester resins may be synthesized from a combination of components selected from the above-mentioned monomer components, by using conventional, known methods. Exemplary methods include the ester exchange method and the direct polycondensation method, which may be used singularly or in a combination. The molar ratio (acid component/alcohol component) when the acid component and alcohol component are reacted, may vary depending on the reaction conditions. The molar ratio is usually about 1/1 in direct polycondensation. In the ester exchange method, a monomer, such as, ethylene glycol, neopentyl glycol or cyclohexanedimethanol, which may be distilled away under vacuum, may be used in excess.

Following seed particle latex preparation, the seed particles are added to a reactor containing an aqueous medium, such as, water or a buffer, surfactant, acrylate monomers and styrene monomers. The mixture is incubated, optionally, at an elevated temperature, for at least an hour to allow the polyester polymers to hydrate and to allow the seed particle to swell. Hence, the temperature can be above room temperature (RT), that is, about 20-25° C., at least about 40° C., at least about 50° C., at least about 60° C., at least about 70° C., at least about 80° C. or higher. Swelling can occur for at least about 1 hour, at least about 2 hours, at least about 3 hours, at least about 5 hours, at least about 7 hours or longer, such as, overnight.

A mixture of styrene and acrylate monomers, surfactant, optional branching agent and optional chain transfer agent is prepared. Then, a portion of that mixture or emulsion is added to the swelling PE seed particles. The amount of emulsion added to the seed particles can be up to about 15%, up to about 12.5%, up to about 10%, up to about 7.5% of the total amount of monomer emulsion used in the synthesis of the hybrid toner particles, but the amount can be outside of those ranges. Those monomers enter into and alight on the seed particles during the swell incubation. Then additional styrene monomer, acrylate monomer and surfactant, and an initiator are added to the swelled seed particles to initiate and to facilitate emulsion polymerization of the poly(acrylate/styrene) polymers within, on and about the seed particles.

Any monomer suitable for preparing a poly(styrene/acrylate) polymer for use in hybrid resin particles may be utilized. The poly(styrene/acrylate) polymer further may be used as a latex, not as part of a hybrid particle latex, for incorporation into toner. Such latexes may be produced by conventional methods.

Suitable monomers include, but are not limited to, styrenes, acrylates, methacrylates, butadienes, isoprenes, acrylic acids, methacrylic acids, acrylonitriles, combinations thereof and the like. Exemplary monomers include, but are not limited to, styrene, alkyl acrylate, such as, methyl acrylate, ethyl acrylate, butyl acrylate, isobutyl acrylate, dodecyl acrylate, n-octyl acrylate, 2-chloroethyl acrylate, β-carboxy ethyl acrylate (β-CEA), phenyl acrylate, methyl α-chloroacrylate, methyl methacrylate (MMA), ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like, vinyl esters, such as, vinyl acetate, vinyl propionate, vinyl benzoate and vinyl butyrate, vinyl ketones, such as, vinyl methyl ketone, vinyl hexyl ketone and methyl isopropenyl ketone, vinylidene halides, such as, vinylidene chloride and vinylidene chlorofluoride, N-vinyl indole, N-vinyl pyrrolidone, methacrylate (MA), acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylenes, isobutylene and the like, and mixtures thereof.

In embodiments, comonomers for making the hybrid poly(styrene/acrylate) resin particles include, but are not limited to, methylmethacrylate, cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, butyl acrylate, hexyl acrylate, ethylhexyl acrylate, butyl methacrylacrylate, hexyl methacrylate, ethylhexyl methacrylate, acrylic acid, methacrylic acid, beta-carboxyethyl acrylate, dimethylamino ethyl methacrylate, 2-(dimethylamino) ethyl methacrylate, diethylamino ethyl methacrylate, dimethylamino butyl methacrylate, methylamino ethyl methacrylate, styrene and combinations thereof. In embodiments, comonomers are selected from methyl methacrylate, butyl acrylate, diacrylate, cyclohexyl methacrylate, styrene, methacrylic acid, dimethylaminoethyl methacrylate and combinations thereof.

Exemplary styrene/acrylate polymers include styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid) and combinations thereof, and the monomers for making same. The polymer may be block, random or alternating copolymers.

Illustrative examples of a styrene/acrylate latex copolymer includes poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile) and the like, and the monomers for making same.

Plural monomers can be used to make a copolymer, for example, styrene and alkyl acrylate, such as, a mixture comprising styrene, n-butyl acrylate and β-CEA. Based on total weight of the monomers, styrene may be present in an amount from about 1% to about 99%, from about 50% to about 95%, from about 70% to about 90%, although may be present in greater or lesser amounts; and acrylate may be present in an amount from about 1% to about 99%, from about 5% to about 50%, from about 10% to about 30%, although may be present in greater or lesser amounts.

In embodiments, the acrylate/styrene monomers optionally may be copolymerized with a charge control agent, such as, methacrylic acid or a dimethylaminoethyl methacrylate, and, for example, styrene/acrylate, which monomers can be used to control, for example, the $T_g$ and hydrophobicity of the polymeric chain.

In the acrylate/styrene polymerization process, the styrene monomer and acrylate monomer are added to a suitable reactor, such as, a mixing vessel comprising an aqueous medium, such as, deionized water (DIW), a buffer and so on, and containing seed particles and surfactant.

Surfactant amount can be split or partitioned with one portion added to the seed particles during swelling and the other portion contributed by the monomer emulsion. Thus, about 25% or less, about 20% or less, about 17.5% or less of the total amount of surfactant can be included with the seed particles. The total amount of surfactant used in making the hybrid resin particle can be from about 0.01% to about 10%, from about 0.05% to about 7.5%, from about 0.1% to about 5% of the total reagents used in making the hybrid resin particle.

After an incubation, optionally at an elevated temperature, to hydrate the polyester polymer and to swell the seed particles, additional acrylate monomer, additional styrene monomer, an initiator, surfactant, optional chain transfer agent and optional branching agent are added to the swelled PE particles comprising styrene and acrylate monomers to enable styrene/acrylate polymerization to occur. In that way, the styrene/acrylate monomers form within the seed particles forming an interpenetrating network in the polyester seed particle, with additional polymer forming at or about the seed particle surface. The styrene and acrylate monomers within the seed particle serve as anchors or as starting sites for polymer formation from within the seed particle. The hybrid resin particles are recovered and used as a hybrid resin, for example, in a toner.

As a surfactant selected for preparation of the seed particle, the surfactant can comprise a branched alkyl diphenyl oxide disulfonate. As provided above, the seed surfactant comprises one or two branched alkyl groups, each at least 11 carbons in size. Surfactant used to form the styrene/acrylate polymer can be the same as that used in making the seed particles.

Examples of surfactants that can be used to form any dispersion or emulsion include sodium hexyl diphenyloxide disulfonate, sodium n-decyl diphenyloxide disulfonate, sodium n-dodecyl diphenyloxide disulfonate, sodium n-hexadecyl diphenyloxide disulfonate, sodium palmityl diphenyloxide disulfonate, n-decyl diphenyloxide disulfonic acid, n-dodecyl diphenyloxide disulfonic acid and tetrapropyl diphenyloxide disulfonic acid. Other surfactants include diphenyloxide disulfonates, such as, DOWFAX 2A1™, DOWFAX 3A2™, DOWFAX 8390™ available Dow Chemical, RHODACAL DSB™ available from Rhone-Poulenc, POLY-TERGENT 2A1™, POLY-TERGENT 2EP™ available from Olin, AEROSOL DPOS-45™ available from Cytec, and CALFAX DBA-40™, CALFAX 16L-35™ or CALFAX DB-45™ available from Pilot Chemicals and the like.

In embodiments, an initiator is added for formation of a latex, such as, forming the styrene/acrylate polymer. Examples of suitable initiators include water soluble initiators, such as, ammonium persulfate (APS), sodium persulfate and potassium persulfate, and organic soluble initiators including organic peroxides and azo compounds including Vazo peroxides, such as, VAZO 64™, 2-methyl 2-2'-azobis propanenitrile, VAZO 88™, 2-2'-azobis isobutyramide dehydrate and combinations thereof. Other water-soluble initiators which may be utilized include azoamidine compounds, for example 2,2'-azobis(2-methyl-N-phenylpropionamidine)dihydrochloride, 2,2'-azobis[N-(4-chlorophenyl)-2-methylpropionamidine]dihydrochloride, 2,2'-azobis[N-(4-hydroxyphenyl)-2-methylpropionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis[2-[1-(2-hydroxyethyl)-2-imidazolin-2-yl]propane]dihydrochloride, 2,2'-azobis[2-(2-imidazolin-2-yl)propane]disulfate dehydrate, 2,2'-azobis[2-(2-imidazolin-2-yl)propane], 2,2'-azobis (1-imino-1-pyrrol idino-2-ethylpropane)dihydrochloride, 2,2'-azobis[2-methyl-N-(2-hydroxyethyl)propionamide] combinations thereof and the like.

An initiator can be added in a suitable amount, such as, from about 0.01 to about 3 weight %, from about 0.1 to about 2 weight % of monomers. The initiator, if water soluble, can be dissolved in water, such as, DIW, for ready access of initiator to monomer. Initiator can be dissolved in a liquid in an amount from about 15 wt % to about 50 wt %, from about 15 wt % to about 40 wt % from about 15 wt % to about 30 wt %. In embodiments, initiator, when in a solution, can be added to monomer at a rate of less than about 35 ml/min.

Initiator need not be added to a monomer mixture all at once, not in a bolus and not too rapidly to ensure maximal exposure of monomer to initiator for even and regular polymerization, in embodiments, of essentially linear polymer with minimal crosslinking. As another means to ensure rapid dispersion of initiator in the monomer mixture, the monomer mixture can be agitated, stirred, mixed, homogenized and the like.

A chain transfer agent optionally may be used to control the polymerization degree of a latex, and thereby control the molecular weight and molecular weight distribution of the product latexes. As can be appreciated, a chain transfer agent can become part of the latex polymer.

A chain transfer agent can have a carbon-sulfur covalent bond. The carbon-sulfur covalent bond has an absorption peak in a wave number region ranging from 500 to 800 $cm^{-1}$ in an infrared absorption spectrum. When the chain transfer agent is incorporated into the latex and the toner made from the latex, the absorption peak may be changed, for example, to a wave number region of 400 to 4,000 $cm^{-1}$.

Exemplary chain transfer agents include, but are not limited to, n-$C_{3-15}$ alkylmercaptans, branched alkylmercaptans, aromatic ring-containing mercaptans and so on. Examples of such chain transfer agents also include, but are not limited to, dodecanethiol (DDT), butanethiol, isooctyl-3-mercaptopropionate, 2-methyl-5-t-butyl-thiophenol, carbon tetrachloride, carbon tetrabromide and the like. The terms, "mercaptan," and, "thiol," may be used interchangeably to mean C—SH group.

Based on total weight of the monomers to be polymerized, the chain transfer agent may be present in an amount from about 0.1% to about 7%, from about 0.5% to about 6%, from about 1.0% to about 5% of the emulsion reagents, although may be present in greater or lesser amounts.

In embodiments, a branching agent optionally may be included in the acrylate/styrene polymerization reaction mixture to induce branching of the polymer, such as, decanediol diacrylate (ADOD).

Based on total weight of the monomers to be polymerized, the branching agent may be present in an amount from about 0% to about 2%, from about 0.05% to about 1.0%, from about 0.1% to about 0.8% of the emulsion reagents, although may be present in greater or lesser amounts.

The poly(styrene/acrylate)-polyester resin particle may have a size from about 155 nm to about 215 nm, from about 165 nm to about 205 nm, from about 175 nm to about 195 nm. The poly(styrene/acrylate)-polyester resin particle can have a molecular weight from about 20 k to about 50 k, from about 25 k to about 45 k, from about 30 k to about 40 k.

As used herein, reference to, "particle size," generally refers to $D_{50}$ mass median diameter (MMD) or the lognormal distribution mass median diameter. The MMD is considered to be the average particle diameter by mass.

In embodiments, the glass transition temperature (T) of the hybrid poly(styrene/acrylate)-polyester resin is higher as compared to a styrene/acrylate control resin or a polyester control resin. In the instance of the hybrid resin particles, the ratio of the polyester seed particles and acrylate/styrene monomer present in the hybrid particles may influence $T_g$, possibly due to polymerization of the styrene/acrylate monomers in the spaces of the polyester resin in the seed particle resulting in smaller spaces for molecule movement at elevated temperatures, see Table 3, where $T_g$ of the hybrid resin of Examples 2 and 3 is about 3° C. to 17° C. higher than the $T_g$ of the control styrene/acrylate resin or polyester resin, as measured by DSC.

D) Toner Particles

The present hybrid resin particles are combined with optionally a wax, optionally a colorant and optionally an amorphous or crystalline polyester resin to form hybrid toners. Those hybrid toners may be combined with any additive package and/or carrier known in the art and formulated into a developer for imaging purposes. In embodiments, the toner particle is an EA toner particle.

a) Resins and Latexes

Any of the foregoing polyester or acrylate/styrene resins further may be used to form the toner particles along with the hybrid resin particles.

b) Surfactants

Any suitable surfactant may be used for the preparation of a latex, pigment or wax dispersion according to the present disclosure. Depending on the emulsion system, any desired nonionic or ionic surfactant, such as, anionic or cationic surfactant, may be contemplated aside from those disclosed above.

Examples of anionic surfactants include, but are not limited to, sodium dodecylsulfate (SDS), sodium dodecylbenzene sulfonate, sodium dodecylnaphthalenesulfate, dialkyl benzenealkyl sulfates and sulfonates, abitic acid, NEOGEN R® and NEOGEN SC® available from Kao, Tayca Power®, available from Tayca Corp., DOWFAX®, available from Dow Chemical Co. and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12},C_{15},C_{17}$-trimethyl ammonium bromides, halide salts of quatemized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals) and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol (available from sanofi as ANTAROX 890®, IGEPAL CA-210®, IGEPAL CA-520®, IGEPAL CA-720®, IGEPAL CO-890®, IGEPAL CO-720®, IGEPAL CO-290®, IGEPAL CA-210® and ANTAROX 897®) and the like, as well as mixtures thereof.

Surfactants may be employed in any desired or effective amount, for example, at least about 0.01% by weight of the reactants, at least about 0.1% by weight of the reactants; and no more than about 10% by weight of the reactants, no more than about 5% by weight of the reactants, although the amount can be outside of those ranges.

c) Colorants

Various known suitable colorants, such as dyes, pigments or mixtures thereof may be included in the toner. The colorant or colorants may be included in the toner in an amount of, for example, 0 (clear) to about 35% by weight of the toner, from about 1 to about 25% of the toner, from about 3 to about 20% by weight of the toner, although amounts outside those ranges may be utilized.

As examples of suitable colorants, mention may be made of carbon black like REGAL 330®; magnetites, such as, Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes, or mixtures thereof, are used. The pigment or pigments can be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corp., Ltd., Toronto, CA, NOVAPERM YELLOW FGL™, HOSTAPERM PINK E™ from sanofi, CINQUASIA MAGENTA™ available from E.I. DuPont de Nemours & Co. and the like. Colorants that can be selected are black, cyan, magenta, yellow and mixtures thereof. Examples of magenta colorants are 2,9-dimethyl-substituted quinacridone and anthraquinone dye identified in the Color Index (CI) as CI 60710, CI Dispersed Red 15, diazo dye identified in the Color Index as CI 26050, CI Solvent Red 19 and the like. Illustrative examples of cyans include copper tetra (octadecyl sulfonamido) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™, and cyan components also may be selected as colorants. Other known colorants can be selected, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G01 (sanofi), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG I (sanofi), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (sanofi), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann, CA), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like.

d) Wax

In addition to the polymer resin, the toners of the present disclosure also may contain a wax, which can be either a single type of wax or a mixture of two or more different waxes. When included, the wax may be present in an amount oft for example, from about 1 wt % to about 25 wt % of the toner particles, from about 5 wt % to about 20 wt % of the toner particles. The melting point of a wax can be at least about 60° C., at least about 70° C., at least about 80° C., but also can be lower. Waxes that may be selected include waxes having, for example, a weight average molecular weight of from about 500 to about 20,000, from about 1,000 to about 10,000. Wax particles can be from about 125 nm to about 250 nm, from about 150 to about 225 nm, from about 175 to about 200 nm in size.

Waxes that may be used include, for example, polyolefins, such as, polyethylene, polypropylene and polybutene waxes, such as, commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K.K., plant-based waxes, such as, carnauba wax, rice wax, candelilla wax, sumacs wax and jojoba oil, animal-based waxes, such as, beeswax, mineral-based waxes and petroleum-based waxes, such as, montan wax, ozokerite, ceresin, paraffin wax, microcrystalline wax and Fischer-Tropsch wax, ester waxes obtained from higher fatty acid and higher alcohol, such as, stearyl stearate and behenyl behenate, ester waxes obtained from higher fatty acid and monovalent or multivalent lower alcohol, such as, butyl stearate, propyl oleate, glyceride monostearate, glyceride distearate, pentaerythritol tetra behenate, ester waxes obtained from higher fatty acid and multivalent alcohol multimers, such as, diethyleneglycol monostearate, dipropyleneglycol distearate, diglyceryl distearate and triglyceryl tetrastearate, sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™ and SUPERSLIP 6530™ available from Micro Powder Inc., fluorinated waxes, for example, POLYFLUO 190™, POLYFLUO 200™, POLYSILK 19™ and POLYSILK 14™ available from Micro Powder Inc., mixed fluorinated, amide waxes, for example, MICROSPERSION 19™ available from Micro Powder Inc., imides, esters, quaternary amines, carboxylic acids or acrylic polymer emulsion, for example, JONCRYL 74™, 89™, 130™, 537™ and 538™, all available from SC Johnson Wax, and chlorinated polypropylenes and polyethylenes available from Allied Chemical and Petrolite Corporation and SC Johnson wax. Mixtures and combinations of the foregoing waxes also may be used, in embodiments.

e) Toner Preparation

The toner particles may be prepared by any method within the purview of one skilled in the art. Although embodiments relating to toner particle production are described below with respect to EA processes, any suitable method of preparing toner particles may be used, including chemical processes, such as, suspension and encapsulation processes disclosed in U.S. Pat. Nos. 5,290,654 and 5,302,486, the entire disclosure of each of which herein is incorporated by reference in entirety.

Toner compositions may be prepared by EA processes, such as, a process that includes aggregating a mixture of at least one polyester resin, at least one styrene/acrylate resin, an optional wax and any other desired or required additives, and emulsions including the resins described above, optionally with surfactants, as described above to form a mixture in a batch reactor. The pH of the resulting mixture may be adjusted by an acid, such as, for example, acetic acid, nitric acid or the like. In embodiments, the pH of the mixture may be adjusted to from about 2 to about 4.5. Additionally, in embodiments, the mixture may be homogenized. If the mixture is homogenized, mixing can be at about 600 to about 4,000 revolutions per minute (rpm). Homogenization may be accomplished by any suitable means, including, for example, with an IKA ULTRA TURRAX T50 probe homogenizer.

The polyester-poly(styrene/acrylate) resins are mixed with optional surfactant to form a resin emulsion. The resin particles can have a size from about 100 nm to about 250 nm, from about 120 nm to about 230 nm, from about 130 nm to about 220 nm, although the particle size can be outside of those ranges. The combined hybrid resin particles then are combined with any optional wax, any optional colorant and other toner reagents as a design choice including additional polyester resins.

In the latex process and toner process of the disclosure, emulsification may be done by any suitable process, such as, mixing, optionally, at elevated temperature. For example, the emulsion mixture may be mixed in a homogenizer set at about 200 to about 400 rpm and at a temperature of from about 20° C. to about 80° C. for a period of from about 1 min to about 20 min, although temperatures and times outside of those ranges can be used.

Any type of reactor may be used without restriction. The reactor can include means for stirring the compositions therein, such as, an impeller. A reactor can include at least one impeller. For forming the latex and/or toner, the reactor can be operated throughout the process such that the impellers can operate at a mixing rate of about 10 to about 1,000 rpm.

The latex of the present disclosure may be melt blended or otherwise mixed with various toner ingredients, such as, an optional wax dispersion, an optional colorant, an optional coagulant, an optional silica, an optional charge enhancing additive or charge control additive, an optional surfactant, an optional emulsifier, an optional flow additive and the like. Optionally, the latex (e.g. around 40% solids) may be diluted to the desired solids loading (e.g. about 12 to about 15% by weight solids), before formulated in a toner composition.

Based on the total toner weight, the latex may be present in an amount from about 50% to about 98%, although may be present in lesser amounts.

Following preparation of the above mixture, an aggregating agent (or coagulant) is added to the mixture. Suitable aggregating agents include, for example, aqueous solutions of a divalent cation or a multivalent cation material. The aggregating agent may be, for example, polyaluminum halides, such as, polyaluminum chloride (PAC), or the corresponding bromide, fluoride or iodide, polyaluminum silicates, such as, polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature ($T_g$) of the resin.

The aggregating agent may be added to the mixture to form a toner in an amount of, for example, from about 0.1 parts per hundred (pph) to about 5 pph, from about 0.25 pph to about 4 pph.

To control aggregation and coalescence of the particles, the aggregating agent may be metered into the mixture over time. For example, the agent may be metered into the mixture over a period of from about 5 to about 240 min, from about 30 to about 200 min. Addition of the agent may also be done while the mixture is maintained under stirred conditions, in embodiments, from about 50 rpm to about 1,000 rpm, from about 100 rpm to about 500 rpm, and at a temperature that is below the $T_g$ of the resin.

The aggregation thus may proceed by maintaining the elevated temperature, or slowly raising the temperature to, for example, from about 40° C. to about 100° C., and holding the mixture at that temperature for a time from about 0.5 hr to about 6 hr while maintaining stirring, to provide the aggregated particles The particles may be permitted to aggregate until a desired particle size is obtained. Particle size can be monitored as known in the art, for example, with a COULTER COUNTER, for average particle size. In embodiments, the particle size may be about 4 to about 7 μm, from about 4.5 to about 6.5 μm, from about 5 to about 6 μm, but may be outside of those ranges.

Once the desired final size of the toner particles is achieved, the pH of the mixture may be adjusted with a base to a value of from about 6 to about 10, from about 5 to about 8. The adjustment of the pH may be utilized to freeze, that is, to stop, toner growth. The base utilized to stop toner growth may include any suitable base, such as, for example, alkali metal hydroxides, such as, for example, sodium hydroxide, potassium hydroxide, ammonium hydroxide, combinations thereof and the like. In embodiments, an agent, such as, ethylenediamine tetraacetic acid (EDTA), may be added to help adjust the pH to the desired values noted above.

The gloss of a toner may be influenced by the amount of retained metal ion, such as, $Al^{3+}$, in the particle. In embodiments, the amount of retained metal ion, for example, $Al^{3+}$, in toner particles of the present disclosure may be from about 0.1 pph to about 1 pph, from about 0.25 pph to about 0.8 pph.

f) Shell

In embodiments, a shell may be applied to the formed aggregated toner particles. Any one or more resins described above or as known in the art may be utilized as the shell resin. The shell resin may be applied to the aggregated particles by any method within the purview of those skilled in the art The aggregated particles described above are combined with said emulsion so that the resin forms a shell over the formed aggregated toner particles.

Toner particles can have a diameter of from about 3 to about 8 μm, from about 3.5 to about 7.5 μm, and the optional shell component may comprise about 20 to about 40% by weight of the toner particles, from about 22 to about 36%, from about 24 to about 32% by weight of the toner particles. In embodiments, the shell has a higher $T_g$ than that of the aggregated toner particles or the core particle.

In embodiments, a photoinitiator, a branching agent and the like may be included in the resin mixture for forming the shell. In embodiments, the shell resin may be in an emulsion including any surfactant described herein. The shell may contain a conductive material, such as, a colorant, such as, a carbon black.

g) Coalescence

Following aggregation to the desired particle size, with formation of a shell as described above, the particles then are coalesced to the desired final shape, the coalescence being achieved by, for example, heating the mixture to a temperature of from about 55° C. to about 100° C., from about 60° C. to about 95° C., which may be below the melting point of a crystalline resin in the toner to prevent plasticization. Higher or lower temperatures may be used, it being understood that the temperature is a function of the resins used.

Coalescence may proceed over a period of from about 1 min to about 9 hr, from about 2 min to about 7 hr, although times outside of those ranges can apply, for example, depending whether coalescence occurs in a batch reactor or in a microreactor.

In a continuous or flow system or reactor, or a microreactor, reduced volumes of reagents are coursed in a unidirectional manner through the reactor. Aggregated particles and reactants, often in a slurry, from a batch or continuous reactor are fed continuously, discontinuously or metered at controllable rates and in controllable amounts by communicating devices, such as, lines, conduits, tubing and so on, composed of suitable materials, to and for incubation in the continuous reactor. The communicating devices can comprise and the continuous reactor comprises one or more devices for controlling temperature of the contents therein, such as, a heating or cooling element. The heating and cooling elements can be positioned along the communication devices and along the flow path of the continuous reactor to provide a controlled or particular temperature profile for the communicated reactants within the communication device and the reactor or reactor unit and the aggregated particle slurry in the continuous reactor. A pump or urging device can cause movement of the slurry from the batch reactor to the continuous reactor. The continuous reactor can comprise other urging devices to maintain a desired flow rate therethrough.

The continuous reactor can comprise a series of tubes, channels, voids, tubular voids, voids within partially flattened or ovoid tubes and the like, any suitable flow path, wherein plural such continuous reactors can be connected in parallel, for example via a manifold, to provide in series a continuous directed flow path through a plurality of devices that comprise the reactor. The continuous reactor can comprise one or more temperature regulating devices, such as, a heating or cooling element, which can comprise a liquid, such as, an oil, that bathes the directed parallel flow path to provide the appropriate temperature or temperature profile along the flow path under which the reaction occurs. The flow path can be connected to an egress device by a communication device, such as, a line, conduit, tubing and the like to course the reacted mixture to a product receiving vessel. The reaction apparatus can be operated under pressure to reduce reagent and fluid boiling points and to ensure unimpeded or continuous movement and uniform flow of the reaction mixture through the reactor.

In embodiments, a continuous reactor of interest comprises a plurality of units comprising, for example, about four regions, flow paths, fluid flow paths, zones, subparts, sections and the like, where each region, zone and the like provides a different environment or different conditions for the slurry contained therein, such as, one region provides a ramping of conditions for coalescence and another subsequent zone can be one where coalescence of particles occurs. In embodiments, the reactor comprises multiple units, parts, components and the like that are connected operably to provide a continuous flow path, where each unit provides a different environment for the contained slurry, and which is where a separate process of toner development occurs.

After coalescence, the mixture may be cooled to room temperature (RT), such as from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method, for example, freeze drying.

b) Additives

Toner particles also may contain other optional additives, as desired or required. For example, the toner may include any known charge additives in amounts of from about 0.1 to about 10 wt %, from about 0.5 to about 7 wt % of the toner. Examples of such charge additives include alkyl pyridinium halides, bisulfates, the charge control additives of U.S. Pat. Nos. 3,944,493, 4,007,293, 4,079,014, 4,394,430 and 4,560,635, the entire disclosure of each of which herein is incorporated by reference in entirety, negative charge enhancing additives, such as, aluminum complexes, and the like.

Surface additives can be added to the toner compositions after washing or drying. Other examples of such surface additives include, for example, metal salts, metal salts of fatty acids, colloidal silicas, metal oxides, strontium titanates, mixtures thereof and the like. Surface additives may be present in an amount of from about 0.1 to about 10 wt %, from about 0.5 to about 7 wt % of the toner. Examples of such additives include those disclosed in U.S. Pat. Nos. 3,590,000, 3,720,617, 3,655,374 and 3,983,045, the entire disclosure of each of which herein is incorporated by reference in entirety. Other additives include zinc stearate and AEROSIL R972® (Degussa). The coated silicas of U.S. Pat. Nos. 6,190,815 and 6,004,714, the disclosure of each of which herein is incorporated by reference in entirety, also can be present in an amount of from about 0.05 to about 5%, from about 0.1 to about 2% of the toner, which additives can be added during aggregation or blended into the formed toner product.

The characteristics of the toner particles may be determined by any suitable technique and apparatus. Volume average particle diameter, $D_{50}$, number average particle diameter, $D_{16n}$, $D_{50n}$, $GSD_v$, $GSD_n$ and so on are an example of useful parameters of characterizing particles and particle populations. Some metrics may be obtained by means of a measuring instrument, such as, a Beckman Coulter MULTISIZER 3, operated as recommended by the manufacturer. Cumulative particle distributions can be used to obtain various population parameters, which can be used to determine, for example, median size, amount of coarse particles, amount of fine particles and so on. The relative amount of fine particles can be determined from the $D_{50n}/D_{16n}$ value, which can be less than about 1.25, less than about 1.24, less than about 1.23, or lower. The percent of fine particles in the populations can be less than about 3.5%, less than about 3%, less than about 2.5%, or lower.

Utilizing the methods of the present disclosure, desirable gloss levels may be obtained. Thus, for example, the gloss of a toner may be, as measured with a Gardner device, from about 20 gloss units (gu) to about 100 gu, from about 50 gu to about 95 gu, from about 60 gu to about 90 gu.

In embodiments, toners of the present disclosure may be utilized as low melt toners, such as, ultra low melt (ULM) toners. In embodiments, the dry toner particles, exclusive of external surface additives, may have the following characteristics:

(1) circularity of from about 0.9 to about 1 (measured with, for example, a Sysmex 3000), from about 0.95 to about 0.99, from about 0.96 to about 0.98;

(2) $T_g$ of from about 45° C. to about 60° C., from about 48° C. to about 55° C.; and/or (3) melt flow index (MFI) in g/10 min (5 kg/130° C.) of from about 79.0 to about 172.5.

Toners may possess favorable charging characteristics when exposed to a variety of relative humidity (RH) conditions. A low humidity zone (B zone) may be about 21° C./15% RH, while a high humidity zone (A zone) may be about 27° C./85% RH. Inclusion of a styrene/acrylate resin in the core provides improved charging of the toner particle under plural environmental conditions as compared to an analogous toner but containing only polyester in the core. Presence of a styrene/acrylate resin enables tuning or altering the composition to obtain a more robust toner particle that is optimized under plural environmental conditions, as revealed by testing and optimized performance in more than one zone, such as, A and B zones. The styrene/acrylate resin(s) also lessens or diminishes less desirable properties of polyester-only toner.

E) Developers

The toner particles thus formed may be formulated into a developer composition. For example, the toner particles may be mixed with carrier particles to achieve a two component developer composition. The toner concentration in the developer may be from about 1% to about 25% by weight of the total weight of the developer with the remainder of the developer composition being the carrier. However, different toner and carrier percentages may be used to achieve a developer composition with desired characteristics.

a) Carriers

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein, such as, a hybrid of interest, or as known in the art. The coating may include fluoropolymers, terpolymers of styrene, silanes and the like. The coating may have a coating weight of, for example, from about 0.1 to about 10% by weight of the carrier.

Various effective suitable means can be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to fuse to the carrier core. The coated carrier particles then may be cooled and thereafter classified to a desired particle size.

F) Imaging Devices

The toners may be used for electrostatographic or electrophotographic processes, including those disclosed in U.S. Pat. No. 4,295,990, the entire disclosure of which herein is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples are submitted to illustrate embodiments of the disclosure. The Examples are intended to be illustrative only and are not intended to limit the scope of the disclosure. Also, parts and percentages are by weight unless otherwise indicated. As used herein, "room temperature," refers to a temperature of from about 20° C. to about 30° C.

EXAMPLES

Example 1: Polyester Seed Particles

Polyester latex was obtained using a phase inversion emulsification process (PIE). An emulsion containing 200 g of polyester resin dissolved in a solvent (120 g methyl ethyl ketone (MEK), 16 g isopropyl alcohol (IPA), 125 g water and 1.65 g of aqueous ammonia) was mixed for 120 min. The dissolved resin was neutralized with 3.31 g of aqueous ammonia. Then, 275 g of water were added slowly to convert the resin solution into a latex at 40° C. under aggressive agitation resulting in particles with a $D_{50}$ size of 105 nm (measured with NANOTRAC). Once seed particle formation was complete, the MEK and IPA solvents were removed, the polyester latex washed and suspended in water at a solids content of 31 wt %.

Example 2: Poly(Acrylate/Styrene)/Polyester Latex—Batch 1

The polyester seed particles of Example 1 (131 g) were added to a reactor with a first portion of an emulsion of n-butyl acrylate, β-CEA, styrene (30 g) and 736 g of DIW, and a first portion of CALFAX DB-40 (1.5 g). The seed particles were incubated for 12 hours at 40° C. to allow the seed particles to swell and to allow the acrylate/styrene monomers to enter into the seed particles. The monomer emulsion comprised 1.4 g of ADOD, 2.8 g of DDT, 11.8 g of β-CEA, 92.7 g of n-butyl acrylate (nBA), 301.6 g of styrene, 7.6 g of CALFAX DB-40 and 187.6 g of DIW.

Following swelling of the polyester seed particles, 11.6 g of an APS solution (in 57.3 g of DIW) were fed into the reactor at a constant feed rate. Next, 605.5 g of the monomer emulsion of n-butyl acrylate and styrene monomers (the second portion of the emulsion) were fed at a constant feed rate into the reactor to facilitate polymerization of acrylate/styrene polymers within, on and about the polyester seed particles. The polymerization was allowed to proceed for about one hour.

Example 3: Poly(Acrylate/Styrene)/Polyester Latex—Batch 2

Hybrid latex particles were prepared as described in Example 2, except 60 g of monomer emulsion (the first portion of the emulsion) were added to the polyester seed particles and the seed particles were incubated for 2 hours at 75° C. to allow the seed particles to swell.

Example 4: Poly(Acrylate/Styrene)/Polyester Latex—Batch 3

Hybrid latex particles were prepared as described in Example 1, except 0.9 g of CALFAX DB45 (the first portion of surfactant) were added to 150 g of seed particles in 441.6 g of DIW and 54 g of monomer emulsion (the first portion) were added to the reactor and the mixture was incubated for 2 hours at 75° C. to swell the seed particles. Then, 363.3 g of the monomer emulsion (the second portion) along with 7 g of APS in 34.4 g of DIW were added to the swelled polyester seed particles. The monomer solution contained 0.84 g of ADOD, 1.68 g of DDT, 7.08 g of β-CEA, 55.62 g of nBA, 180.96 g of styrene, 4.56 g of CALFAX DB45 and 112.6 g of DIW.

Example 5: Hybrid Particle Properties

Samples from each of Batches 1-3 were taken at intervals to monitor growth of the particles. Toners of Batches 1 and 2 were configured to comprise about 9.3% polyester and the toner of Batch 3 comprises about 16.4% polyester.

No separation between the polyester polymers and the poly(acrylate/styrene) polymers was observed. Particle size measurements using a NANOTRAC device confirmed single peaks all through the batch incubation, indicating acrylate/styrene polymer chains continuously grew within, on and about polyester particles with an average $D_{50}$ particle size (PS) of 200 nm. The final samples were submitted for scanning electron microscope (SEM) analysis which revealed individual particles of roughly circular or ovoid shape.

TABLE 1

Particle size dependent on formulation adjustment and process

| Sample ID | Weight of polyester seed (g) | SA monomers during swelling (g) | Swelling temperature (° C.) | Swelling time (hr.) | PS $D_{50}$ (nm) |
|---|---|---|---|---|---|
| Batch 1 | 131 | 30 | 40 | 12 | 203.7 |
| Batch 2 | 131 | 60 | 75 | 2 | 200.5 |
| Batch 3 | 150 | 54 | 75 | 2 | 201.0 |

The process for preparing the poly(acrylate/styrene) and polyester hybrid latex particles is a semi-continuous process, wherein the acrylate/styrene polymer chains continuously grow within polyester latex particles without separation. The method provides a wide range for tuning the weight ratio between poly(styrene/acrylate) and polyester in the final hybrid latex composition.

Example 6: Analysis of the Hybrid Particles

The $T_g$ of the final hybrid latex samples for Batches 1 and 2 was measured by differential scanning calorimetry (DSC). The results are provided in Table 2 along with a comparison to poly(acrylate(Ac)/styrene(St)) control resin particles and polyester control resin particles.

TABLE 2

Glass Transition Temperature of Final Hybrid Latex

| Sample ID | Onset of Second Transition (° C.) | Midpoint of Second Transition (° C.) |
|---|---|---|
| Poly(St/Ac) Control | 53.5 | 58.9 |
| Polyester Control | 57.8 | 62.7 |
| Batch 1 | 65.6 | 69.6 |
| Batch 2 | 70.0 | 72.1 |

As compared to the polyester and poly(styrene/acrylate) control latexes, the hybrid latexes demonstrate a higher $T_g$. Without wishing to be bound by a theory, that difference in $T_g$ may be due to the growth of the poly(styrene/acrylate) chains in pockets, voids and regions of the polyester seed particles, resulting in smaller spaces for molecular movement at elevated temperatures, such as, near $T_g$. The acrylate/styrene polymers also could grow and entwine with polyester molecules forming tight physical entanglements. Varying the ratio of polyester seed particles to acrylate/styrene monomers used during swelling may allow tuning $T_g$.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

The entire content of all references cited herein is incorporated by reference in entirety.

We claim:

1. A poly(styrene/acrylate)-polyester hybrid particle comprising a polyester seed particle and poly(styrene/acrylate) polymers interspersed therein and thereon, wherein poly(styrene/acrylate) polymer chains are entangled within the polyester seed particle in an interpenetrating network;
   wherein the hybrid particle has a particle size of from about 175 nm to about 215 nm at $D_{50}$.

2. The hybrid particle of claim 1, wherein the poly(styrene/acrylate) polymers are selected from styrene acrylates, styrene methacrylates and combinations thereof.

3. The hybrid particle of claim 1, wherein the poly(styrene/acrylate) polymer is selected from poly(styrene-alkyl acrylate), poly(styrene-alkyl methacrylate), poly(styrene-propyl acrylate), poly(styrene-butyl acrylate), poly(styrene-butyl methacrylate), and combinations thereof.

4. The hybrid particle of claim 1, wherein the poly(styrene/acrylate) polymer further comprises a chain transfer agent and/or a branching agent.

5. The hybrid particle of claim 1, wherein the polyester seed particle comprises a crystalline resin.

6. The hybrid particle of claim 1, wherein the polyester seed particle comprises an amorphous resin.

7. The hybrid particle of claim 1, wherein the poly(acrylate/styrene) polymers are present from about 5% to about 95% by weight of the hybrid resin particle.

8. The hybrid particle of claim 1, wherein the polyester of the polyester seed particle is substantially crosslinkage free.

9. The hybrid particle of claim 1, wherein the polyester seed particle is prepared using phase inversion emulsification.

10. A polyester hybrid particle comprising a polyester seed particle and an interspersed polymer interspersed therein and thereon, wherein polymer chains of the interspersed polymer are entangled within the polyester seed particle in an interpenetrating network;
    wherein the interspersed polymer is selected from poly(styrene-alkyl acrylate), poly(styrene-alkyl methacrylate), poly(alkyl methacrylate-alkyl acrylate), poly(alkyl methacrylate-aryl acrylate), poly(aryl methacrylate-alkyl acrylate), poly(styrene-propyl acrylate), poly(styrene-butyl acrylate), poly(styrene-butyl methacrylate), poly(butyl methacrylate-butyl acrylate), and combinations thereof;
    wherein the hybrid particle has a particle size of from about 175 nm to about 215 nm at $D_{50}$.

11. A method of making the hybrid particle of claim 1, comprising:
    forming polyester seed particles;
    swelling the seed particles in a solution comprising a styrene monomer, an acrylate monomer and a surfactant; and
    adding additional styrene monomer and additional acrylate monomer to said solution, and adding initiator and additional surfactant to said solution, and forming a styrene acrylate polymer, wherein the styrene acrylate polymer is interspersed therein and thereon said polyester seed particles to form an interpenetrating polymer network with said polyester.

12. The method of claim 11, wherein the polyester of the polyester seed particle is substantially crosslinkage free.

13. The method of claim 11, wherein the polyester seed particle is prepared using phase inversion emulsification.

* * * * *